(12) United States Patent
Darrah et al.

(10) Patent No.: US 12,165,404 B2
(45) Date of Patent: Dec. 10, 2024

(54) SYSTEMS AND METHODS FOR IDENTIFYING SUBSURFACE HYDROGEN ACCUMULATION

(71) Applicant: Ohio State Innovation Foundation, Columbus, OH (US)

(72) Inventors: Thomas Darrah, Westerville, OH (US); Ian Howat, Worthington, OH (US); Joachim Moortgat, Columbus, OH (US); Colin Whyte, Grove City, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/528,434

(22) Filed: Dec. 4, 2023

(65) Prior Publication Data

US 2024/0104924 A1    Mar. 28, 2024

Related U.S. Application Data

(63) Continuation of application No. 18/558,132, filed as application No. PCT/IB2022/054008 on Apr. 29, 2022.

(Continued)

(51) Int. Cl.
*G06V 20/10* (2022.01)
*G01V 8/00* (2006.01)
(Continued)

(52) U.S. Cl.
CPC ............... *G06V 20/10* (2022.01); *G01V 8/00* (2013.01); *G06T 7/10* (2017.01); *G06V 10/764* (2022.01);
(Continued)

(58) Field of Classification Search
CPC ..... G06V 20/10; G06V 10/764; G06V 10/774
See application file for complete search history.

(56) References Cited

U.S. PATENT DOCUMENTS

2010/0149917 A1    6/2010  Imhof
2018/0188403 A1    7/2018  Halsey
(Continued)

FOREIGN PATENT DOCUMENTS

RU    2593438 C2    8/2016
WO    2022229928 A1   11/2022

OTHER PUBLICATIONS

Zgonnik et al. "Evidence for natural molecular hydrogen seepage associated with Carolina bays (surficial, ovoid depressions on the Atlantic Coastal Plain, Province of the USA)," Progress in Earth and Planetary Science (2015) 2:31, DOI 10.1186/s40645-015-0062-5 (Year: 2015).*

(Continued)

*Primary Examiner* — Ross Varndell
(74) *Attorney, Agent, or Firm* — K&L Gates LLP

(57) ABSTRACT

Systems, apparatuses, methods, and computer program products are disclosed for training an image analysis engine to identify surface features of the Earth consistent with subsurface hydrogen accumulation. An example method includes receiving, by communications circuitry, a training dataset of labeled images illustrating surface features consistent with subsurface hydrogen accumulation, the surface features consistent with subsurface hydrogen accumulation comprising ovoid surficial depressions. The example method further includes training, by a model generator and using the training dataset, an image classification model of the image analysis engine to identify whether new images contain surface features consistent with subsurface hydrogen accumulation. The example method further includes (Continued)

hosting the image classification model by the image analysis engine.

18 Claims, 6 Drawing Sheets

Related U.S. Application Data

(60) Provisional application No. 63/182,624, filed on Apr. 30, 2021.

(51) Int. Cl.
*G06T 7/10* (2017.01)
*G06V 10/764* (2022.01)
*G06V 10/774* (2022.01)

(52) U.S. Cl.
CPC .. *G06V 10/774* (2022.01); *G06T 2207/20081* (2013.01); *G06T 2207/20182* (2013.01); *G06T 2207/30181* (2013.01)

(56) References Cited

U.S. PATENT DOCUMENTS

| | | |
|---|---|---|
| 2020/0160173 A1 | 5/2020 | Pandey |
| 2020/0183032 A1 | 6/2020 | Liu |
| 2024/0020968 A1* | 1/2024 | Haskin .................. G06F 16/29 |

OTHER PUBLICATIONS

Moretti et al., "Long-term monitoring of natural hydrogen superficial emissions in a brazilian cratonic environment. Sporadic large pulses versus daily periodic emissions," International Journal of Hydrogen Energy, vol. 46, Issue 5, 2021, https://doi.org/10.1016/j.ijhydene.2020.11.026. (Year: 2021).*

International Search Report and Written Opinion for PCT/IB2022/54008 dated Sep. 13, 2022.

* cited by examiner

SYSTEMS AND METHODS FOR IDENTIFYING SUBSURFACE HYDROGEN ACCUMULATION

CROSS-REFERENCE TO RELATED APPLICATIONS

This application comprises a continuation application of U.S. application Ser. No. 18/558,132 filed Oct. 30, 2023, which comprises a U.S. national stage entry of International Application No. PCT/IB2022/054008 filed Apr. 29, 2022, and which claims the benefit of priority to U.S. Provisional Application No. 63/182,624 filed Apr. 30, 2021, the entireties of which are hereby incorporated by reference.

BACKGROUND

Hydrogen is considered a fundamentally important resource in the global transition to a prospective low-carbon future, and its demand is expected to grow significantly over the coming decades as societies look for alternatives to fossil fuels. Although hydrogen is the most abundant element in the universe, the primary sources of usable hydrogen today are either carbon-intensive (such as steam-methane reforming or coal gasification) or energy-intensive (such as electrolysis of water). As a result, most hydrogen is produced inefficiently, and hydrogen is relegated to the role of energy carrier rather than primary energy source. Large volumes of hydrogen are naturally produced in the subsurface of the Earth, but subsurface exploration for natural hydrogen, as well as associated production strategies, are still in their formative stages. Analogous to the state of hydrocarbon exploration in the 1850s, almost all hydrogen drilling targets to date have been discovered accidentally during exploration for petroleum, geothermal, or groundwater resources, or through observations of hydrogen-rich surface seeps.

BRIEF SUMMARY

The discoveries of natural hydrogen (sometimes also called geological or native hydrogen) have largely been accidental or serendipitous findings or based on observations of elevated hydrogen concentrations in surface seeps. Moreover, the potential for hydrogen generation in continental settings is expansive based on the abundance of suitable source rocks (mafic and ultramafic rocks comprise over 10% of the continental crust). However, exploration for geologic accumulations of natural hydrogen has been severely limited by an inadequate understanding of the conditions under which mafic and ultramafic rocks constitute significant sources of hydrogen, the formations that serve as hydrogen reservoirs, traps, and seals, along with the level of hydrogen consumption in the shallow crust by oxidation, bio-utilization, diffusional loss, and adsorption onto clay minerals. To produce economic volumes of natural hydrogen, an exploration strategy must be based on identification of the appropriate geological settings that enable hydrogen generation and permit retention of hydrogen and prevent the transmission of oxidizing water or fresh water that contains hydrogen-consuming microbes into hydrogen reservoirs. Once identified, drilling technologies used in both the petroleum and geothermal energy industries can be adapted to economically exploit natural hydrogen as a non-carbon source of energy or chemical feedstock.

Methods, apparatuses, and systems are disclosed herein for identifying subsurface hydrogen accumulations. As described below, example embodiments apply machine learning and remote sensing to automatically identify geomorphological features that are consistent with subsurface hydrogen accumulation. Furthermore, various example embodiments set forth techniques for analyzing such geomorphological features to identify those most likely to be active sources of producible hydrogen (e.g., sources that are currently producing hydrogen).

In one example embodiment, a method is provided for training an image analysis engine to identify surface features of the Earth consistent with subsurface hydrogen accumulation. The method includes receiving, by communications circuitry, a training dataset of labeled images illustrating surface features consistent with subsurface hydrogen accumulation, the surface features consistent with subsurface hydrogen accumulation comprising ovoid surficial depressions, training, by a model generator and using the training dataset, an image classification model of the image analysis engine to identify whether images contain surface features consistent with subsurface hydrogen accumulation, and hosting the trained image classification model by the image analysis engine.

In a related embodiment, a corresponding apparatus is provided for training an image analysis engine to identify surface features of the Earth consistent with subsurface hydrogen accumulation. The apparatus includes communications circuitry configured to receive a training dataset of labeled images illustrating surface features consistent with subsurface hydrogen accumulation, the surface features consistent with subsurface hydrogen accumulation comprising ovoid surficial depressions, and a model generator configured to train, using the training dataset, an image classification model of the image analysis engine to identify whether images contain surface features consistent with subsurface hydrogen accumulation, wherein the image analysis engine is configured to host the trained image classification model.

In another related embodiment, a corresponding computer program product is provided for training an image analysis engine to identify surface features of the Earth consistent with subsurface hydrogen accumulation. The computer program product includes at least one non-transitory computer-readable storage medium storing software instructions that, when executed, cause an apparatus to receive a training dataset of labeled images illustrating surface features consistent with subsurface hydrogen accumulation, the surface features consistent with subsurface hydrogen accumulation comprising ovoid surficial depressions; and train, using the training dataset, an image classification model of the image analysis engine to identify whether images contain surface features consistent with subsurface hydrogen accumulation, wherein the trained image classification model is hosted by the image analysis engine.

In another example embodiment, a method is provided for automatically identifying surface features of the Earth consistent with subsurface hydrogen accumulation. The method includes receiving, by communications circuitry, a target image, identifying, by an image analysis engine and using a trained image classification model, whether the target image contains any surface features consistent with subsurface hydrogen accumulation, and outputting, by the communications circuitry, an indication of whether the target image contains any surface features consistent with subsurface hydrogen accumulation.

In a related embodiment, a corresponding apparatus is provided for training an image analysis engine to identify surface features of the Earth consistent with subsurface hydrogen accumulation. The apparatus includes communications circuitry configured to receive a target image and an image analysis engine configured to identify, using a trained image classification model, whether the target image contains any surface features consistent with subsurface hydrogen accumulation, wherein the communications circuitry is further configured to output an indication of whether the target image contains any surface features consistent with subsurface hydrogen accumulation.

In another related embodiment, a corresponding computer program product is provided for training an image analysis engine to identify surface features of the Earth consistent with subsurface hydrogen accumulation. The computer program product includes at least one non-transitory computer-readable storage medium storing software instructions that, when executed, cause an apparatus to receive a target image, identify, using a trained image classification model, whether the target image contains any surface features consistent with subsurface hydrogen accumulation, and output an indication of whether the target image contains any surface features consistent with subsurface hydrogen accumulation.

In yet another example embodiment, a method is provided for automatically identifying surface features of the Earth indicative of active subsurface hydrogen accumulation. The method includes receiving, by communications circuitry, information describing an ovoid surface feature of the Earth, automatically estimating, by a relevance determination engine, a likelihood that the ovoid surface feature is indicative of active subsurface hydrogen accumulation, determining, by the relevance determination engine, whether the estimated likelihood satisfies a predetermined threshold; and in an instance in which the estimated likelihood satisfies the predetermined threshold, outputting, by the communications circuitry, an indication that the surface feature is indicative of active subsurface hydrogen accumulation.

In yet another example embodiment, a method is provided for automatically identifying surface features of the Earth indicative of active subsurface hydrogen accumulation. The method includes receiving, by communications circuitry, information describing an ovoid surface feature of the Earth, automatically estimating, by a relevance determination engine, a likelihood that the ovoid surface feature is indicative of active subsurface hydrogen accumulation, determining, by the relevance determination engine, whether the estimated likelihood satisfies a predetermined threshold; and in an instance in which the estimated likelihood satisfies the predetermined threshold, outputting, by the communications circuitry, an indication that the surface feature is indicative of active subsurface hydrogen accumulation.

In another related embodiment, a corresponding computer program product is provided for automatically identifying surface features of the Earth indicative of active subsurface hydrogen accumulation. The computer program product includes at least one non-transitory computer-readable storage medium storing software instructions that, when executed, cause an apparatus to receive information describing an ovoid surface feature of the Earth, automatically estimate a likelihood that the ovoid surface feature is indicative of active subsurface hydrogen accumulation, determine whether the estimated likelihood satisfies a predetermined threshold, and in an instance in which the estimated likelihood satisfies the predetermined threshold, output an indication that the surface feature is indicative of active subsurface hydrogen accumulation.

Finally, yet another example embodiment sets forth a method for automatically identifying surface features of the Earth indicative of active subsurface hydrogen accumulation. The method includes receiving, by communications circuitry, a training dataset of labeled images illustrating surface features consistent with subsurface hydrogen accumulation, and training, by a model generator and using the training dataset, an object detection model to identify regions within images containing surface features consistent with subsurface hydrogen accumulation. The method further includes receiving, by the communications circuitry, a target image, and identifying, by image analysis engine and using the object detection model, a region within the target image containing a surface feature consistent with subsurface hydrogen accumulation. The method further includes automatically estimating, by a relevance determination engine, a likelihood that the identified surface feature is indicative of active subsurface hydrogen accumulation, determining, by the relevance determination engine, whether the estimated likelihood satisfies a predetermined threshold, and in an instance in which the estimated likelihood satisfies the predetermined threshold, outputting, by the communications circuitry, an indication that the surface feature is indicative of active subsurface hydrogen accumulation.

In a related embodiment, a corresponding apparatus is provided for automatically identifying surface features of the Earth indicative of active subsurface hydrogen accumulation. The apparatus includes communications circuitry configured to receive a training dataset of labeled images illustrating surface features consistent with subsurface hydrogen accumulation, and a model generator configured to train, using the training dataset, an object detection model to identify regions within images containing surface features consistent with subsurface hydrogen accumulation, wherein the communications circuitry is further configured to receive a target image. The apparatus further includes an image analysis engine configured to identify, using the object detection model, a region within the target image containing a surface feature consistent with subsurface hydrogen accumulation, and a relevance determination engine configured to: automatically estimate a likelihood that the identified surface feature is indicative of active subsurface hydrogen accumulation, and determine whether the estimated likelihood satisfies a predetermined threshold, wherein the communications circuitry is further configured to, in an instance in which the estimated likelihood satisfies the predetermined threshold, output an indication that the surface feature is indicative of active subsurface hydrogen accumulation.

In another related embodiment, a corresponding computer program product is provided for automatically identifying surface features of the Earth indicative of active subsurface hydrogen accumulation. The computer program product includes at least one non-transitory computer-readable storage medium storing software instructions that, when executed, cause an apparatus to receive a training dataset of labeled images illustrating surface features consistent with subsurface hydrogen accumulation, and train, using the training dataset, an object detection model to identify regions within images containing surface features consistent with subsurface hydrogen accumulation. The software instructions, when executed, further cause the apparatus to receive a target image, identify a region within the target image containing a surface feature consistent with subsurface hydrogen accumulation, and automatically estimate a likelihood that the identified surface feature is indicative of active subsurface hydrogen accumulation. The software instructions, when executed, further cause the apparatus to determine whether the estimated likelihood satisfies a predetermined threshold and, in an instance in which the estimated likelihood satisfies the predetermined threshold, output an indication that the surface feature is indicative of active subsurface hydrogen accumulation.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
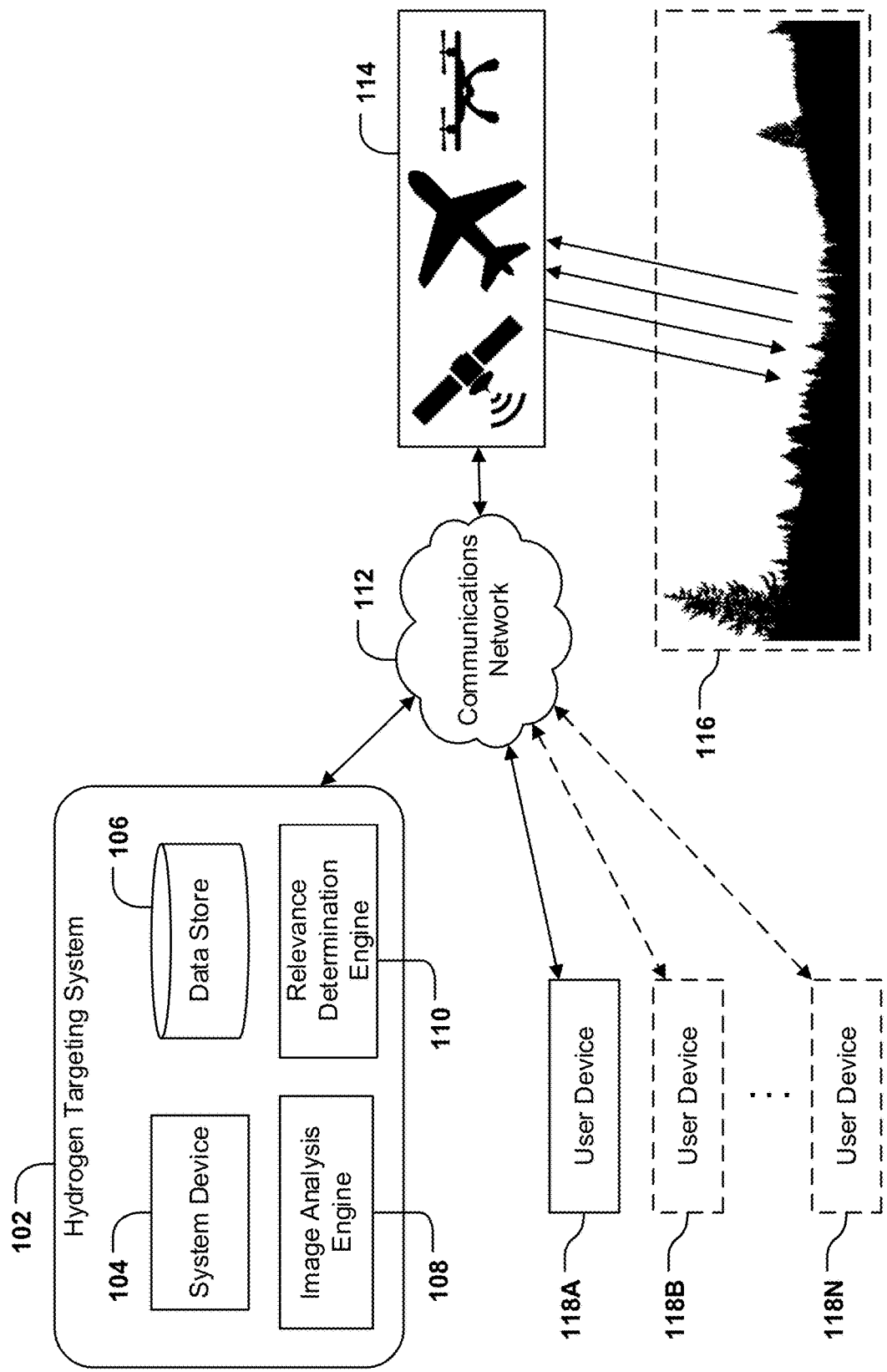
FIG. 1 illustrates an example system in which some example embodiments may be used for identifying subsurface accumulations of hydrogen.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of industrial computers, desktop computers, personal data assistants (PDAs), laptop computers, tablet computers, smart books, personal computers, smartphones, wearable devices (such as headsets, smartwatches, or the like), programmable logic controllers (PLCs), programmable automation controllers (PACs), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Due to the lack of awareness of the existence of natural hydrogen accumulation in the subsurface, historically there has not been a significant demand for natural hydrogen exploration techniques. As a result, there is a lack of knowledge of the extant volumes of hydrogen accumulation in the subsurface, and no adequate conceptual model for identifying specific locations of subsurface accumulations of hydrogen. Thus, it has until now been very difficult to identify and evaluate subsurface natural hydrogen resources for extraction. Methods, apparatuses, systems, and computer program products are described herein that enable the identification of geomorphological surface features that likely indicate the existence of active subsurface hydrogen accumulations.

Example solutions described herein train and apply image classification tools that can automatically identify geological features from satellite or airborne remote sensing observations as potential targets for natural subsurface hydrogen exploration in the context of a $\underline{S}$ource, $\underline{M}$igration, $\underline{R}$eservoirs, $\underline{T}$raps, and $\underline{S}$eals model. Moreover, through the application of machine learning algorithms (e.g., deep learning using neural networks) coupled with analysis of remote sensing data and other characteristics of surface features of interest, example embodiments enable the identification of potential natural hydrogen accumulations based on the proximity of suitable components of a hydrogen SMaRTS system to geomorphological surface features.

Figure 3:
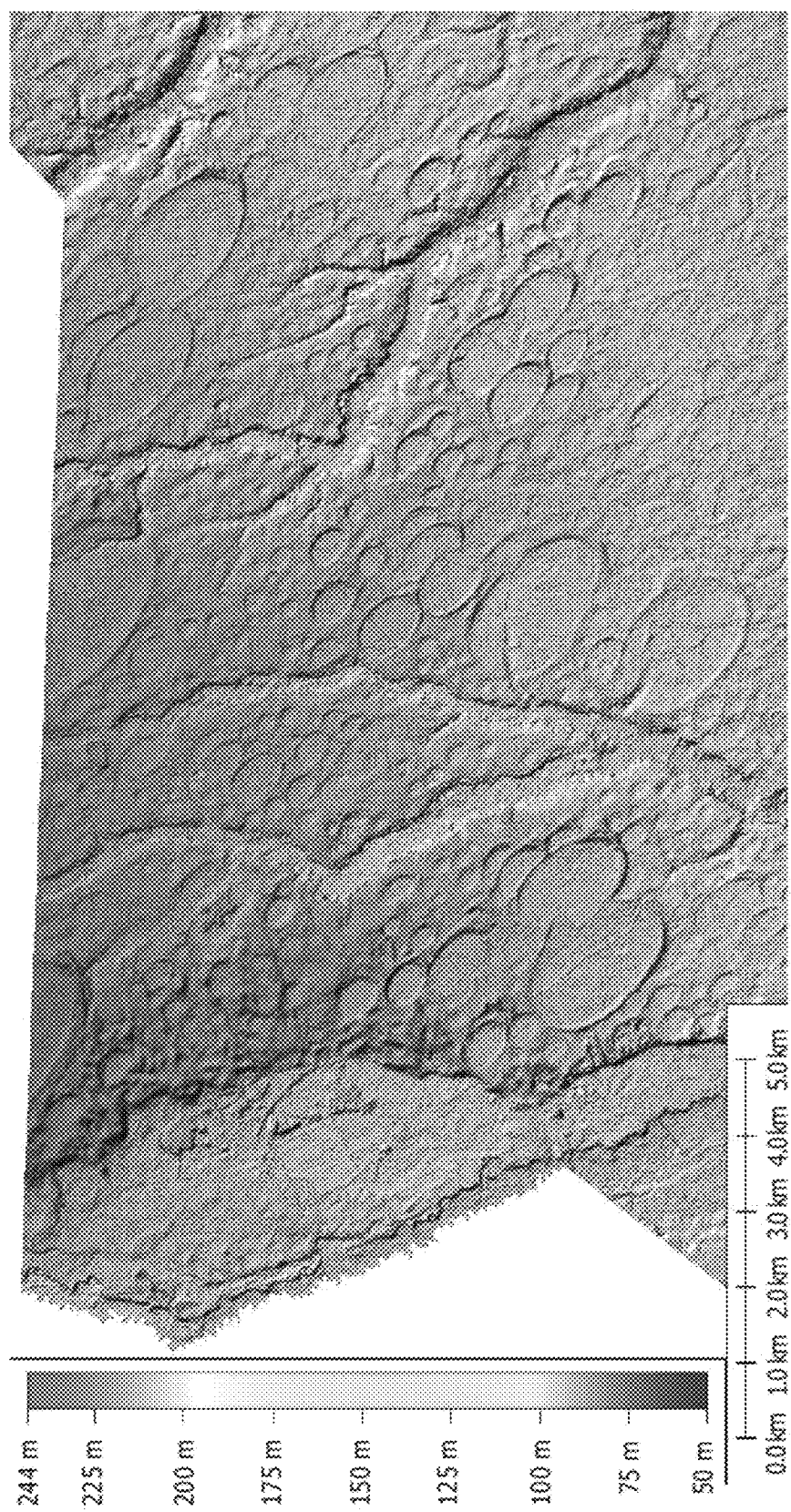
FIG. 3 illustrates laser imaging, detection, and ranging (LiDAR) elevation image of 300 square miles of Carolina bays in Robeson County, North Carolina.

Underpinning these solutions are new advances in the understanding of the surface features consistent with subsurface hydrogen accumulation. In particular, ovoid surface features (sometimes also called "bays" or "fairy circles") have been linked to hydrogen seepage in the US, Brazil, France, Russia, and elsewhere and have recently been explored for hydrogen production in Mali, Brazil, and the United States. Specifically, 'Carolina Bays'-type ovoid features (shown in FIG. 3), which comprise elliptical or circular surface depressions with diameters ranging from hundreds of meters to several kilometers across, have been associated with focused hydrogen migration pathways and spillover of hydrogen past the spill point of hydrogen traps.

Known Carolina Bay ovoid surface features can be identified visually from freely available satellite imagery. Accordingly, example embodiments described herein utilize machine learning techniques to detect these types of ovoids and distinguish those associated with surficial hydrogen seepage from those formed by other geomorphological processes (e.g., sinkholes, kettle lakes, meteorite impacts, or the like). Once hydrogen-related ovoid features (i.e., "targets") are identified, imaging (e.g., LiDAR) and/or GPS monitoring of these features can be used to closely monitor surface deformation. Zones of active deformation are likely in close proximity (i.e., hydraulic communication) with subsurface systems currently experiencing natural hydrogen generation, migration, or water-rock reactions induced by hydrogen reactions during fluid migration and/or serpentinization. Conversely, static "target" (i.e., without any deformation) zones likely record evidence of prior stages of hydrogen migration. In the former case, the identification of active hydrogen systems can be used to prioritize drilling strategies and identify viable drilling targets when combined with robust characterization of the hydrogen SMaRTS systems by traditional subsurface techniques (e.g., well petrophysical logging, seismic reflection). In the latter case, based on subsequent characterization by traditional subsurface techniques (e.g., well petrophysical logging, seismic reflection), this information can be used to eliminate some "targets" (preventing unnecessary drilling expenditures) or alternatively to establish a secondary database of potential targets depending on an adequate characterization of adjacent hydrogen SMaRTS systems by traditional subsurface techniques (e.g., well petrophysical logging, seismic reflection). Thus, satellite and airborne (e.g., LiDAR) data can both identify targets that were not previously explored and/or also allow the prioritization of zones of modern hydrogen activity as evidenced by active surface deformation.

While many geological "Carolina-Bay-type" ovoid features may have been associated with hydrogen migration pathways at some time, only a (small) subset will be associated with active hydrogen generation systems. Further, the subset of ovoid features associated with active hydrogen generation may or may not contain adequate components of the hydrogen SMaRTS system to produce subsurface accumulations of hydrogen, or the presence of previously charged subsurface reservoirs of substantially recoverable hydrogen. However, the most attractive locations (i.e., highest priority targets) will exhibit active/dynamic surface deformations (e.g., swelling or contraction) of the order of millimeters to centimeters per year with the potential for major seasonal swings related to localized precipitation patterns. The mechanism(s) that lead to deformation can be multi-fold and include subsurface serpentinization and decarbonation reactions, which can locally expand (up to ~44% during $CO_2$ mineralization to serpentine, magnesite and other carbonates).

Therefore, example embodiments are designed to detect dynamic ovoid features as promising targets for subsurface hydrogen exploration. As with landslides, fault zones, or sinkholes, actively deforming ovoid surface features will increasingly diverge in geomorphic and ecological signature from the surrounding landscape. To detect such dynamics, high resolution (<30 m) multispectral images can capture anomalies in vegetation and, in the case of bare ground, alteration that may be related to deformation rate. Similarly, the more active an ovoid, the more its surface morphology should contrast from the surrounding landscape. Example embodiments thus utilize digital elevation models (DEMs) with resolutions better than 10 m in the horizontal and better than 5 m in the vertical to identify these anomalous features in combination with multispectral imagery. Finally, example embodiments may in some cases directly reveal surface deformation via remote sensing observations using LIDAR and Interferometric Synthetic Aperture Radar (InSAR) collected from both air and space, such as from Sentinel-1, TerraSAR-X, TanDEM-X, or the like. Successful measurement from InSAR requires high microwave coherence between images, and therefore may only be applicable in more arid, low-vegetation areas. Regardless, ovoid surface features suspected to be dynamic based on the combination of remote sensing observations can then be targeted for Global Navigation Satellite System (GNSS) surveys to provide ground truth.

As described herein, example embodiments provide methods and apparatuses that enable improved identification of subsurface hydrogen accumulations through automated image analysis, remote sensing, and application of a SMaRTS conceptual model for hydrogen. Considering the recent and expected future growth in demand for natural hydrogen in combination with the carbon-intensity and/or energy-intensity of current methods for generating human-made hydrogen, there is a large and growing need for tools enabling the production of natural hydrogen in the subsurface. Example embodiments provide such tools that provide an automated, systematic, and comprehensive approach for identifying locations where hydrogen has likely been generated, transported, and most importantly, accumulated (i.e., trapped), in economic volumes in the subsurface.

Although a high-level explanation of the operations of example embodiments has been provided above, specific details regarding the configuration of some example embodiments are provided below.

Subsurface Hydrogen Formation

In natural systems, the hydration of Fe-rich igneous rocks containing abundant olivine and pyroxene minerals is known to produce hydrogen, magnetite ($Fe_3O_4$), and other iron-bearing minerals, through the serpentinization reactions tabulated below (Table 1). While most often observed along mid-ocean ridges where seawater interacts with heated mafic and ultramafic rocks, these reactions can also occur in continental settings where groundwater contacts Fe-rich igneous intrusions, which encompass around 10% of the continental crust globally. Where adequate geologic settings, environmental conditions (e.g., temperature, pH, oxygen fugacity, chemical composition, and pressure), and time of water-rock interactions exist, economic volumes of natural hydrogen are generated and can potentially exploited as a carbon-free energy source.

TABLE 1

Hydrogen-Generating Serpentinization Reactions
Serpentinization Reactions

| Mineral | Mineral Phase | Reaction | Moles of Igneous Material | Moles of $H_2$ |
|---|---|---|---|---|
| Olivine | Fayalite | $3Fe_2SiO_4 + 2H_2O \rightarrow 2Fe_3O_4 + 3SiO_2 + 2H_2$ | 3 | 2 |
| Pyroxene | Ferrosilite | $3Fe_2Si_2O_6 + 2H_2O \rightarrow 2Fe_3O_4 + 6SiO_2 + 2H_2$ | 3 | 2 |
| Olivine | Forsterite | $2Mg_2SiO_4 + 3H_2O \rightarrow Mg_3Si_2O_5(OH)_4 + Mg(OH)_2$ | 2 | 0 |

Subsurface exploration for natural hydrogen, as well as associated production strategies, however, are in their formative stages and suffer from a fundamental misunderstanding of the optimal geologic settings and subsurface environmental conditions that both produce large quantities of natural hydrogen and suitably retain natural hydrogen (i.e., prevent it from being consumed or transformed to another chemical phase) over time. This would allow natural hydrogen to accumulate and be stored in accessible and economic reservoirs in the subsurface. For example, the long-term persistence of accumulated hydrogen in the subsurface is highly susceptible to biodegradation or chemical oxidation even at relatively modest temperatures (15-200° C.), lost from reservoir fluids by clay adsorption or diffusive loss through sealing units, and/or consumed by abiogenic methane formation at temperature above ~200° C. While many of these factors are also relevant to oil and gas resources, sensitivity to these conditions is significantly greater for the highly labile hydrogen molecule.

Without an adequate understanding of these factors and the tools to predict their characteristics in the subsurface, the development of an exploration strategy and/or drilling program to exploit natural hydrogen accumulations would be inherently random, chaotic, and, as evidenced by the early history of petroleum exploration, not economically or technically sound. Even today, in spite of significant technological advances in subsurface science, seep-drilling and wildcatting for hydrocarbon resources remain extremely low probability (albeit occasionally high reward) endeavors. A thorough review of current hydrogen drilling strategies reveals that these same naïve strategies are being deployed to explore for natural hydrogen today. Based on the behavior of hydrogen, significantly greater reliance on predictive subsurface characteristics and data science and data processing techniques are needed to enable the development of natural hydrogen exploration and production strategies.

A SMaRTS Model for Hydrogen

Petroleum geology utilizes a "SMaRTS" conceptual model developed and refined over ~150 years of trial and error in petroleum exploration and production. The result of this intensely expensive, time-consuming and iterative process is an approach for hydrocarbon generation, accumulation, and retention in sedimentary basins. These hydrocarbon "SMaRTS" systems contain five key components (Source, Migration, Reservoir, Trap, and Seal) that, if present and of suitable characteristics, greatly enhance the success rates for identifying and evaluating oil and gas resources and subsequent petroleum recovery in petroliferous sedimentary systems.

Although different petroleum companies have their own proprietary versions and derivations of the SMaRTS model, the general approach requires understanding: 1) the Source (e.g., shales in hydrocarbon systems), which encompasses determining the rock units from which petroleum is generated, when, and how much petroleum is produced; 2) Migration, which encompasses the timing of petroleum migration from source rocks, how (i.e., the mechanism by which) petroleum travels through the subsurface (e.g., episodic in response to tectonic conditions, continuously diffusive in response to leaky source rocks and seals), and how much petroleum is degraded as fluids flow to reservoirs, traps, and seals, as well as later stages of hydrocarbon degradation and migration after initially reaching reservoirs (i.e., tertiary migration), traps, and seals; rigorous characterizations of 3) Reservoirs, which are ideally large 3-D structures of highly porous and permeable formations (e.g., sandstone, limestone) that accumulate and store large volumes of hydrocarbons and later enables them to be flowed to producing wells with relative ease; 4) Traps, which are structural or stratigraphic sequences surrounded by laterally extensive impermeable units, that establish the 3-D volume of resource accumulation; and 5) Seals, which are impermeable units such as shale, evaporites, or low porosity and unfractured (i.e., low permeability) igneous bodies, that prevent the further buoyant migration of hydrocarbons; notably, the viability of seals vary according to the composition of the fluid. Characterizing the presence, integrity, and evolution of each of these components over time is critical for economically producing resources from the subsurface, including hydrogen.

While the SMaRTS strategy for hydrocarbon recovery has been reliable and successful, no comparable conceptual model or workflow currently exists for natural hydrogen resource development. Moreover, as mentioned above, early strategies for hydrogen exploration models appear naïve, immature, and focused on strategies relevant for hydrocarbon exploration instead of suited for hydrogen resources. Accordingly, a need exists to develop robust strategies for hydrogen SMaRTS in a timely manner. One such approach is described herein.

As an initial matter, both hard- and soft-rock analogues for stratigraphic/structural traps and high-quality seals targeted in the petroleum industry are plausible for natural hydrogen systems, though the geologic nature of these components might be quite different. In particular, the geological setting, the formations that constitute each of these components, and the interpretation of how they would have functioned over time will often differ from traditional hydrocarbon exploration strategies because, for hydrogen exploration, these elements typically exist within or in close proximity to igneous (mafic or ultramafic) bodies.

As a result, the Source rock for economical natural hydrogen are mafic and ultramafic igneous rocks (olivine- and pyroxene-bearing with elevated reduced iron ($Fe^{2+}$) contents), as well as metamorphosed remnants of these rocks. To locate accumulations of naturally occurring hydrogen, it is critical to locate hydrogen Source rocks in geologic and stratigraphic regions with naturally optimized thermochemical conditions, hydraulic flow, and deformation. Since water is a requisite reactant for serpentinization to occur, sufficient hydraulic flow in contact with the surface area of the Source rock is required. Excessive primary or secondary porosity are uncommon in deeply buried lithologies and hence an additional consideration is required to locate source rocks with enhanced porosity, permeability, and/or brittle deformation (i.e., natural fractures) in order to achieve sufficient surface area for water-rock reactions to reach thermodynamic completion.

Characterizing the timing and mechanism(s) of hydrogen Migration is also critical in order to evaluate the long-term stability of hydrogen and/or adequately assess formations adjacent to the source rocks that are viable targets for the RTS components of a hydrogen SMaRTS model. In the case of hydrogen, the migration of fluids (e.g., hydrogen, pore waters, geothermal waters, and meteoric water introduced into the subsurface) is critical given the potential for chemical oxidation, respiration, abiogenic methane formation, and/or diffusive loss. The mechanisms (e.g., buoyant flow) by which hydrogen will Migrate are similar to that of other deeply-derived gases (e.g., $CO_2$, hydrocarbons), which includes advective fluid flow or buoyant migration through porous lithologies and/or permeable deformation features (e.g., fractures, faults).

An optimal Reservoir will possess a high permeability and porosity, and thus could consist of sandstones or limestones, like traditional hydrocarbon systems, in cases where mafic and ultramafic igneous rocks have been emplaced in sedimentary basins. However, given the potential for hydrogen SMaRTS systems to exist in igneous and/or metamorphic terranes, fractured rock reservoirs are also likely to be an important type of reservoir for hydrogen systems. It is important to note the very act of igneous emplacement and/or the process of serpentinization and mineralization associated with decarbonation can lead to intense fracturing in the brittle crust and may enable the development of co-located fractured reservoirs.

For prolonged retention of hydrogen, the Reservoir must be within a Trap that is overlain by a suitable Seal. Lastly, the suitable Seal must have extremely low porosity and permeability (i.e., nanodarcy scale) that is suitable for retarding the flow of hydrogen, which allows for hydrogen retention, and simultaneously prevents the transmission of oxidizing or fresh water that contains hydrogen consuming microbes into hydrogen reservoirs.

Seals could consist of shales, evaporites, or even other heavily cemented sedimentary units. However, like reservoirs, the geological settings of anticipated hydrogen generation also provides additional seal options, such as superior low porosity and unfractured sills, heavily cemented/mineralized superior low porosity and fractured sills, or evaporites deposited following rifting; in the latter case, natural serpentinization and decarbonation reactions can suffice to precipitate minerals in open pore spaces (pores, vugs, and/or fractures), reduce hydraulic conductivity, and create self-sealing units capable of preventing hydrogen generation. In the presence of these Seals and Reservoirs, 3-D structural or stratigraphic Traps can be identified and accessed.

General geologic settings where natural hydrogen generation predictably occurs and has the potential for economic recovery include: continental rifts (e.g., the Mid-Continental Rift (USA), the São Francisco Basin (Brazil), the Triassic Rift Basin (eastern seaboard)), Ophiolites (e.g., New Caledonia (France), the Coast Range Ophiolite (USA), Northern Oman), and areas where ferrobasaltic/tholeiitic volcanics are found (e.g., Iceland, Salton Trough (USA and Mexico)).

System Architecture

Example embodiments described herein may be implemented using any of a variety of computing devices or servers. To this end, FIG. 1 illustrates an example environment within which various embodiments may operate. As illustrated, a hydrogen targeting system 102 may include a system device 104 in communication with a data store 106. Although the system device 104 and data store 106 are described in singular form, some embodiments may utilize more than one system device 104 and/or more than one data store 106. Additionally, some embodiments of the hydrogen targeting system 102 may not require a data store 106 at all, and may instead access relevant geochemical or geophysical data, when required, from third party data sources (not shown in FIG. 1) via communications network 112 (e.g., the Internet). The hydrogen targeting system 102 further includes an image analysis engine 108, which may utilize machine learning modeling to analyze images and identify geomorphological features that are consistent with hydrogen accumulation in the subsurface. The hydrogen targeting system 102 further includes a relevance determination engine 110, which may estimate a likelihood that a given surface feature (identified via image analysis engine 108 or via another mechanism) is indicative of active subsurface hydrogen accumulation. As described in greater detail below, the image analysis engine 108 and the relevance determination engine 110 may be components of system device 104 or may be distinct components of the hydrogen targeting system 102. Whatever the implementation, the hydrogen targeting system 102 and its constituent components may exchange information via communications network 112 with any number of other devices, such as one or more remote sensing device 114 and one or more user device (e.g., user device 118A, user device 118B, through user device 118N).

System device 104 may be implemented as one or more servers, which may or may not be physically proximate to other components of the hydrogen targeting system 102. Furthermore, some components of system device 104 may be physically proximate to the other components of the hydrogen targeting system 102 while other components are not. System device 104 may receive, process, generate, and transmit data, signals, and electronic information to facilitate the operations of the hydrogen targeting system 102. To this end, a memory of the system device 104 may store control signals, device characteristics, and access credentials enabling interaction between the hydrogen targeting system 102 and one or more external devices, such as remote sensing device(s) 114, user device(s) 118A-118N, or the like. Particular components of system device 104 are described in greater detail below with reference to apparatus 200 in connection with FIG. 2.

Data store 106 may comprise a distinct component from system device 104, or may comprise an element of system device 104 (e.g., memory 204, as described below in connection with FIG. 2). Data store 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 112). Data store 106 may store information relied upon during operation of the hydrogen targeting system 102, such as geochemical datasets (e.g., fluid chemistries, well petrophysical logs, seismic reflection data, and the like) about existing petroleum and geothermal wells, as well as seeps, which may be available to the public through government agencies such as the Bureau of Land Management, the U.S. Geological Survey, and the U.S. Department of Energy, or from outside literature, or proprietary sources of gas geochemical data. Data store 106 may, in this regard, store an extensive collection of measurements of hydrogen and other important gas and aqueous geochemical tracers (such as noble gases) from oil and gas, geothermal, $CO_2$, and other industrial wells, fumaroles, gas seeps, springs, and water supply boreholes. Data store 106 may further store data regarding various stratigraphic units around the world, as well as seismic, gravity, or other geophysical data gathered from a variety of sources, such as the Advanced National Seismic System (ANSS), USArray, or other similar sources of broad-based data about seismic activity around the world and that may be used by the hydrogen targeting system 102.

Because image analysis engine 108 and relevance determination engine 110 may in some embodiments comprise components of system device 104, these elements will be described in greater detail below in connection with a description of the various components of system device 104. However, as noted elsewhere herein, it will be appreciated that these components may comprise discrete physical elements of the hydrogen targeting system 102, and may be co-located with the other components of the hydrogen targeting system 102 or, in some embodiments, may be located remotely from each other or from the other components of the hydrogen targeting system 102.

Remote sensing devices 114 may comprise any of a number of different remote sensing devices. For instance, an example remote sensing device 114 may be a spaceborne device such as a satellite or satellite system, such as such as any of Landsat 7 or 8, or higher resolution commercial satellites such as DigitalGlobe/Maxar's WorldView constellation (Satellites 1, 2, and 3). Additionally, or alternatively, a remote sensing device 114 may comprise an aerial device such as an aircraft or unmanned aerial vehicle (UAV). Each remote sensing device 114 may retrieve data regarding a particular geomorphological feature or region 116 and may do so passively (where the reflection of another signal, such as sunlight, is captured) or actively (where the remote sensing device 114 emits a signal and detects a reflection of the signal). The captured data may comprise any of a variety of types of information, such as satellite or aerial observations (which include panchromatic, multispectral or hyperspectral imagery), or surface (including vegetation where present) or bare-Earth elevations from photogrammetry, photoclinometry, interferometry, LiDAR, or radar altimetry).

The one or more user devices 118A-118N may be embodied by any computing devices known in the art, such as desktop or laptop computers, tablet devices, smartphones, or the like. User devices 118A-118N may be utilized by various individuals interacting or operating the hydrogen targeting system 102. For instance, a first user may be proximate to the hydrogen targeting system 102 and may utilize a user device 118A to interact with the hydrogen targeting system 102. Meanwhile, a second user may be located in the field nearby a particular surface feature of interest, and may utilize user device 118B to interact with the hydrogen targeting system 102. Any number of additional users may also utilize user devices to interact with the hydrogen targeting system 102 or the other users thereof. The one or more user devices 118A-118N need not themselves be independent devices, but may be peripheral devices communicatively coupled to other computing devices.

Although FIG. 1 illustrates an environment and implementation in which the hydrogen targeting system 102 interacts with any of user devices 118A-118N, in some embodiments users may directly interact with the hydrogen targeting system 102 (e.g., via input/output circuitry of system device 104), in which case a separate user device may not be required. Whether by way of direct interaction or via a separate user device, a user may communicate with, operate, control, modify, or otherwise interact with the hydrogen targeting system 102 to perform the various functions and achieve the various benefits described herein.

Example Implementing Apparatuses

Figure 2:
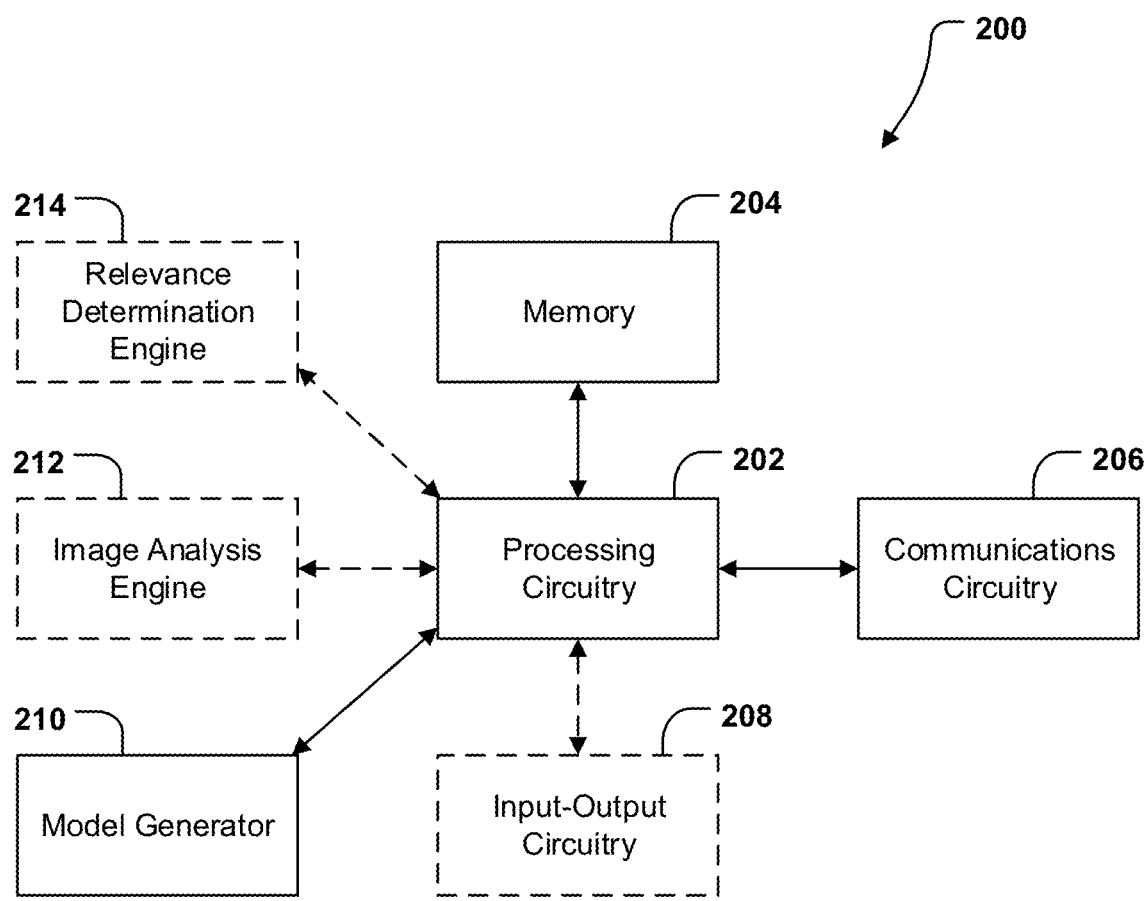
FIG. 2 illustrates a schematic block diagram of example circuitry embodying a system device that may perform various operations in accordance with some example embodiments described herein.

System device 104 of the hydrogen targeting system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, model generator 210, image analysis engine 212, and relevance determination engine 214, each of which will be described in greater detail below. While the various components are only illustrated in FIG. 2 as being connected with processor 202, the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 4-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof. As used herein, the term processor 202 may refer to any of a number of types of processing devices, including one or more central processing unit (CPU), designed generally to control operation of the hydrogen targeting system 102, and one or more separate graphics processing unit (GPU) that may be leveraged in particular by the model generator 210 and/or image analysis engine 212 for training and utilization of various machine learning models.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein. As previously mentioned, the data store 106 may be stored by memory 204 in some embodiments.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as one of user devices 118A-118N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a model generator 210 configured to train an image classification model using a training dataset to identify whether an image contains an image of a geomorphological feature consistent with subsurface hydrogen accumulation. As described in connection with FIG. 3 below, the model generator 210 may utilize processor 202, memory 204, or any other hardware component included in the apparatus 200 to perform these functions. The model generator 210 may be configured to train any of a number of different types of machine learning models that may comprise the image classification model. Certain image classification models trained by the model generator 210 may comprise object detection models to identify regions within images containing surface features consistent with subsurface hydrogen accumulation, or may comprise semantic segmentation models to identify the pixels of an image corresponding to surface features consistent with subsurface hydrogen accumulation. The model generator 210 may be configured to train a deep artificial neural network of any kind as an image classification model, such as a convolutional neural network (e.g., U-Net or a residual neural network like ResNet). The model generator may train the image classification model as described below in connection with FIG. 4. The model generator 210 may further utilize communications circuitry 206 to transmit data to, and/or receive data from, a variety of sources (e.g., user device 118A through user device 118N, as shown in FIG. 1), and may utilize input-output circuitry 208 to transmit data to a user and/or receive data from a user.

In addition, the apparatus 200 may also comprise an image analysis engine 212 configured to host a machine learning model trained to identify geomorphological features that are consistent with hydrogen accumulation in the subsurface. The machine learning model may comprise an image classification model that may be trained by the model generator 210 to perform image analysis comprising image classification, object detection, semantic segmentation, or the like. The image analysis engine 212 may utilize processor 202, memory 204, or any other hardware component included in the apparatus 200 to perform its various operations, as described in connection with FIGS. 4 and 5 below. The image analysis engine 212 may further utilize communications circuitry 206 to gather data from a variety of sources (e.g., user device 118A through user device 118N, data store 106, a remote sensing device 114, or the like, as shown in FIG. 1), and may utilize input-output circuitry 208 to exchange data with a user. It will be understood that the image analysis engine 212 may in some embodiments comprise a separate dedicated element that uses purpose-built physical components to enable its operation.

Finally, the apparatus 200 may also comprise a relevance determination engine 214 configured to estimate the likelihood that a given ovoid surface feature is indicative of active subsurface hydrogen accumulation. The relevance determination engine 214 may utilize processor 202, memory 204, or any other hardware component included in the apparatus 200 to perform this operation, as described in connection with FIG. 6 below. The relevance determination engine 214 may further utilize communications circuitry 206 to gather data from a variety of sources (e.g., user device 118A through user device 118N, data store 106, remote sensing device 114, or the like, as shown in FIG. 1), and may utilize input-output circuitry 208 to exchange data with a user. It will be understood that the relevance determination engine 214 may in some embodiments comprise a separate dedicated element that uses purpose-built physical components to enable its operation.

Although components 202-214 are described in part using functional language, it will be understood that the particular implementations necessarily include the use of particular hardware. It should also be understood that certain of these components 202-214 may include similar or common hardware. For example, the model generator 210, image analysis engine 212, and relevance determination engine 214 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the model generator 210, image analysis engine 212, and relevance determination engine 214 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the model generator 210, image analysis engine 212, and relevance determination engine 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. As noted previously, image analysis engine 212 and relevance determination engine 214 may comprise separate components of the hydrogen targeting system 102 from the system device 104. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, that apparatus 200 may be in remote communication with one or more of the other components described above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 4:
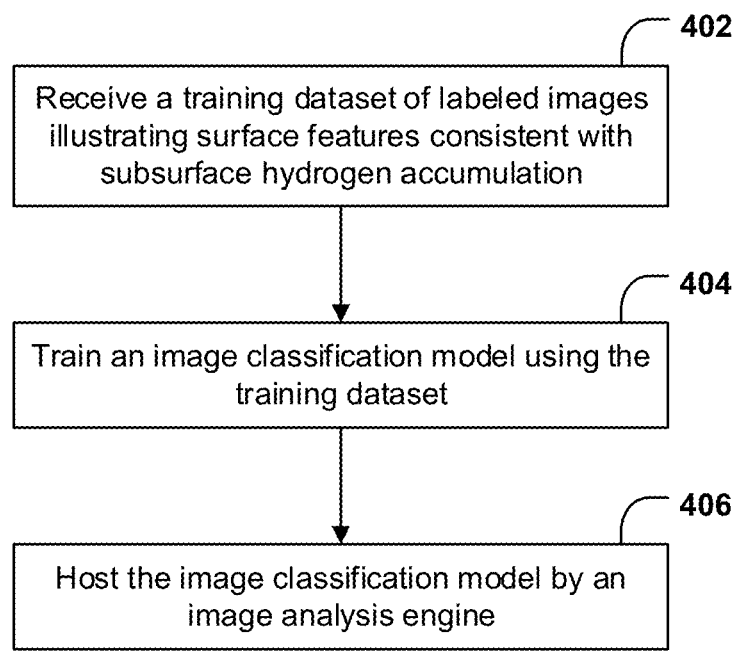
FIG. 4 illustrates an example flowchart for training an image analysis engine to identify surface features of the Earth consistent with subsurface hydrogen accumulation, in accordance with some example embodiments described herein.
Figure 5:
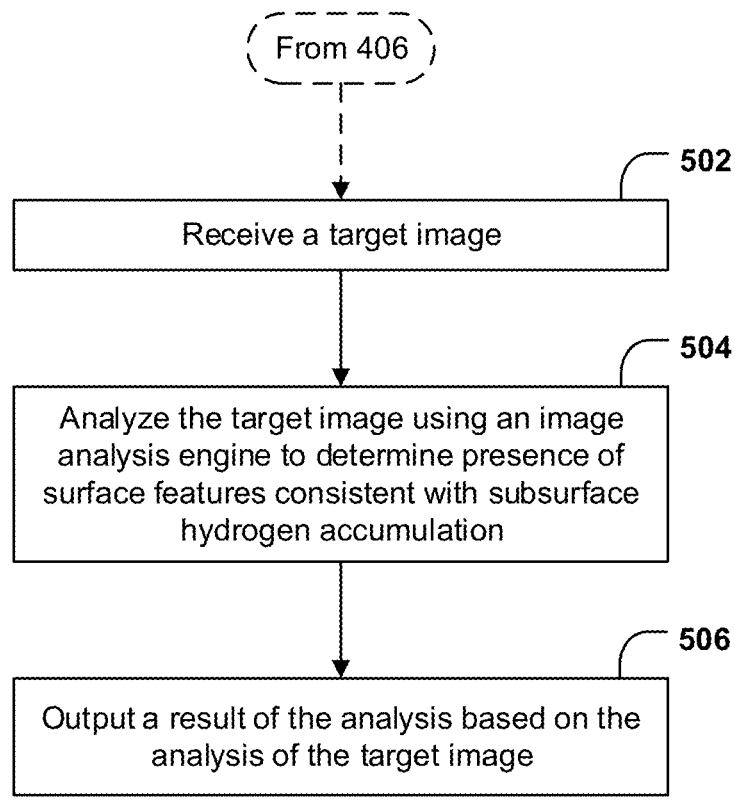
FIG. 5 illustrates an example flowchart for automatically identifying surface features of the Earth consistent with subsurface hydrogen accumulation, in accordance with some example embodiments described herein.
Figure 6:
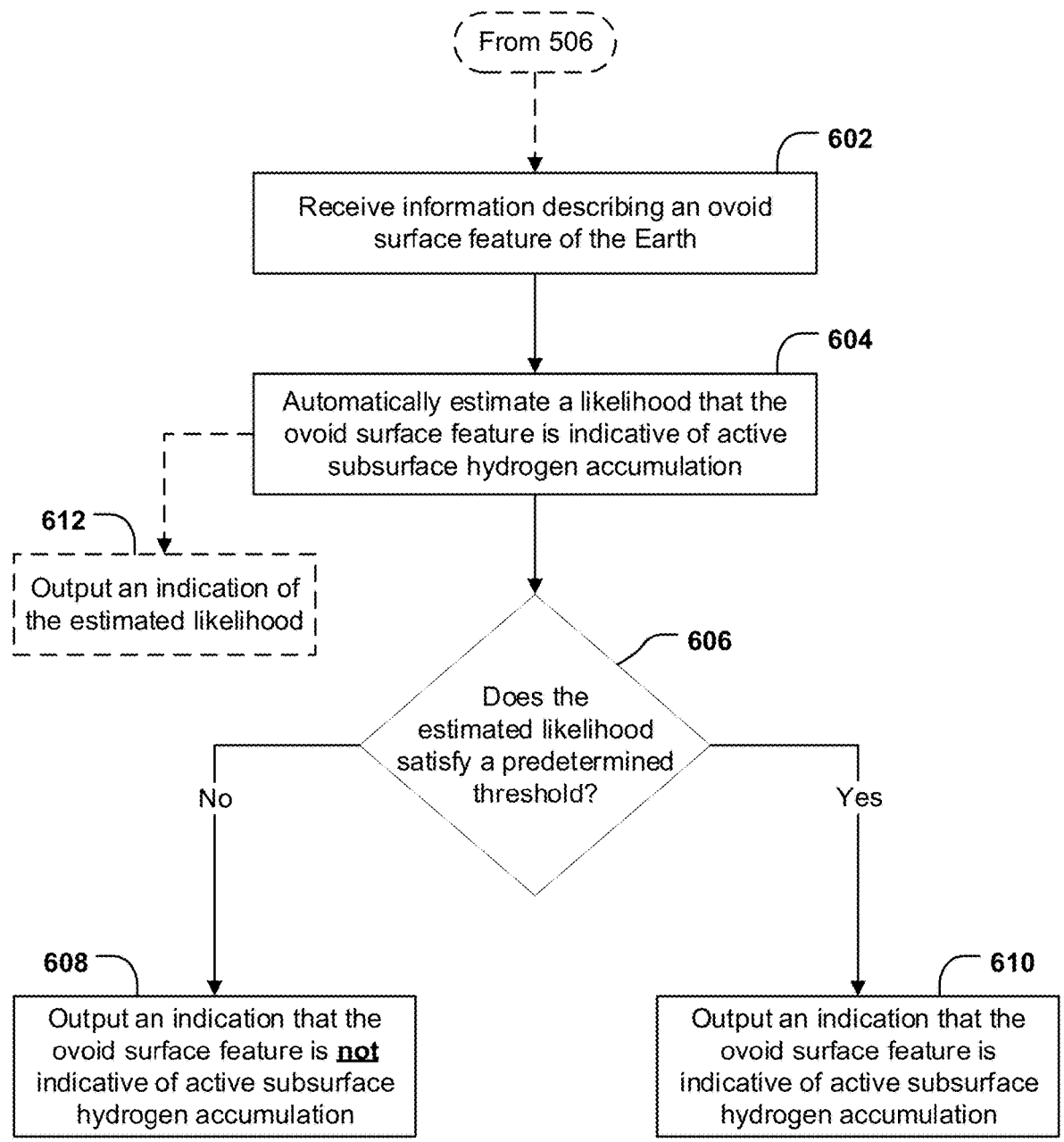
FIG. 6 illustrates another example flowchart for automatically identifying surface features of the Earth indicative of active subsurface hydrogen accumulation, in accordance with some example embodiments described herein.

Turning to FIGS. 4, 5, and 6, example flowcharts are illustrated that contain example operations relating to the identification of subsurface accumulations of hydrogen. The operations illustrated in FIGS. 4-6 may, for example, be performed by the hydrogen targeting system 102 shown in FIG. 1, and more particularly by a system device 104 that may be embodied by an apparatus 200, which is shown and described in connection with FIG. 2. To perform the operations described below, the apparatus 200 may utilize one or more of processor 202, memory 204, communications circuitry 206, input-output circuitry 208, model generator 210, image analysis engine 212, relevance determination engine 214, and/or any combination thereof. It will be understood that user interaction with the hydrogen targeting system 102 may occur directly via input-output circuitry 208, or may instead be facilitated by a separate user device (e.g., user devices 118A-118N as shown in FIG. 1), and which may have similar or equivalent physical componentry facilitating such user interaction.

Turning first to FIG. 4, example operations are shown for training an image analysis engine to identify surface features of the Earth consistent with subsurface hydrogen accumulation.

As shown in operation 402, the apparatus 200 includes means, such as memory 204, communications circuitry 206, input-output circuitry 208, or the like, for receiving a training dataset of labelled images illustrating surface features consistent with subsurface hydrogen accumulation. The training dataset may be received from a separate device via communications circuitry 206. Additionally, or alternatively, the training dataset may be received from a user or peripheral device via input-output circuitry 208. Of course, in some scenarios, the training data may not be received from a separate source, but may be stored locally to the apparatus 200. Or rather, the apparatus 200 may come to the data, such as by being be deployed to a local system environment where the training data is already hosted, thereby reducing the computational burden of transmitting large volumes of training data from one location to another. As noted previously, the received surface features consistent with subsurface hydrogen accumulation may comprise ovoid surficial depressions. Of course, other surface features will be illustrated in various received images that are consistent with, and which in some cases may separately be indicative of, of the presence of subsurface hydrogen accumulation. In implementations where the image classification model to be trained comprises an object detection model, the training dataset may also include a set of bounding boxes for each image in the labeled set of images, each bounding box for a particular image surrounding a corresponding segment of the image that contains a surface feature consistent with subsurface hydrogen accumulation. In implementations where the image classification model to be trained comprises a semantic segmentation model, the training dataset may include a set of pixel-wise masks for each image in the labeled set of images, the set of pixel-wise masks for a particular image identifying collectively identifying whether every pixel of the particular image corresponds to a surface feature consistent with subsurface hydrogen accumulation.

As shown by operation 404, the apparatus 200 includes means, such as model generator 210 or the like, for training an image classification model using the training dataset. The model generator 210 may be configured to train an artificial neural network as an image classification model. The artificial neural network may comprise a fully convolutional neural network. Fully convolutional neural networks, such as those in the 'U-Net' family, comprise a number of 'decoders' and 'encoders', or down- and up-samplers, that learn to identify features at multiple spatial scales. A downside of readily available U-Net implementations is that they often require fixed-sized input images and large amounts of computer memory even for small images. Because images received from a remote sensing device 114 are often significantly larger than the images typically utilized by such modeling solutions, utilization of deep neural network with many hidden layers, like U-Net and ResNet, may present certain inefficiencies. Accordingly, model generator 210 may also utilize a modified version of convolutional neural networks that allows for direct processing of full-size Landsat, GeoEye, QuickBird, WorldView, Planet, or other satellite images (i.e., ~billions of pixels) on consumer graphics cards (GPUs) within seconds. Such modifications may involve any of 1) input layers that allow for any image size, 2) reducing the number or encoder/decoder layers in a U-Net-like network, 3) optimizing kernel sizes in each convolutional layer, 4) using striding instead of max pooling to spatially downscale the input, 5) increasing the receptive fields of the neural network, and/or 6) keeping the size of the feature maps constant throughout all the layers of the neural network. These optimizations allow for a large number of trainable parameters while minimizing memory and computational requirements.

In some embodiments, the image classification model comprises an object detection model, in which case the model generator 210 may train the image classification model to identify regions within images containing surface features consistent with subsurface hydrogen accumulation. In other embodiments, the image classification model comprises a semantic segmentation model, in which case the model generator 210 may train the image classification model to identify every pixel of an image corresponding to surface features consistent with subsurface hydrogen accumulation.

As shown by operation 406, the apparatus 200 includes means, such as image analysis engine 212 or the like, for hosting the trained image classification model. Hosting the image classification model may comprise storing the trained in a memory associated with the image analysis engine 212 to facilitate subsequent utilization of the trained image classification model by the image analysis engine 212.

In some embodiments, the procedure may end following completion of operation 406. However, in other embodiments, the procedure may thereafter advance to the set of operations illustrated in FIG. 5 and described below, in which case the trained image classification model may be applied to analyze new images received by the apparatus 200.

Turning next to FIG. 5, example operations are shown for automatically identifying surface features consistent with subsurface hydrogen accumulation. As noted above, the series of operations illustrated in FIG. 5 may be performed as the initial set of operations in a given procedure, or they may be performed following training of an image classification model as set forth in FIG. 4, in which case operation 502 may be reached following completion of operation 406.

As shown by operation 502, the apparatus 200 includes means, such as memory 204, communications circuitry 206, input-output circuitry 208, or the like, for receiving a target image. The target image may in some cases be a panchromatic, multispectral, or hyperspectral image, a satellite image, a panchromatic, multispectral, or hyperspectral satellite image, or any other type of image that may be captured of a surface feature. The target image may be received from a variety of sources. For instance, the target image may be received from a local memory 204 of the apparatus 200, which may have previously stored the target image after the apparatus 200 upon its receipt from a separate device. The target image may alternatively be received by communications circuitry 206, which may receive the target image from a separate device such as a remote sensing device 114, a user device (e.g., one of user devices 118A-118N), or a remote data store containing the target image. Still further, the information may be received from input-output circuitry 208 in scenarios where the target image is provided directly by a user, such as via a peripheral device.

As shown by operation 504, the apparatus 200 includes means, such as image analysis engine 212 or the like, for analyzing the target image to determine the presence of a surface feature consistent with the subsurface accumulation of hydrogen. Prior to analyzing the target image, the image analysis engine 212 may in some cases first perform orthorectification on the target image to remove distortion caused by the relative locations of the satellite capturing the image and the surface features illustrated in the target image. Orthorectification may not be necessary in every embodiment, and the need for orthorectification of the target image may depend on the source of the target image. To analyze the target image, the image analysis engine 212 may identify, using a trained image classification model, whether the target image contains any surface features consistent with subsurface hydrogen accumulation. This trained image classification model may comprise a deep neural network, as discussed previously. In some embodiments, the image classification model may comprise an object detection model, in which case the image analysis engine 212 may analyze the target image using the object detection model to identify all regions within the target image containing surface features consistent with subsurface hydrogen accumulation. In some embodiments, the image classification model may comprise a semantic segmentation model, in which case the image analysis engine 212 may analyze the target image using the semantic segmentation model to identify every pixel in the target image that corresponds to a surface feature consistent with subsurface hydrogen accumulation.

It will be understood that the image analysis engine 212 is not limited to analysis of just a single image, and instead may analyze a sequence of target images. To this end, the image analysis engine 212 may receive a set of target images, and may analyze all of the target images in the set of target images.

As shown by operation 506, the apparatus 200 includes means, such as memory 204, communications circuitry 206, input-output circuitry 208, image analysis engine 212, or the like, for outputting a result of the analysis of the target image. This output may identify whether the target image contains any surface features consistent with subsurface hydrogen accumulation. In implementations where the image classification model comprises an object detection model, the output may identify any regions within the target image containing surface features consistent with subsurface hydrogen accumulation, such as by superimposing bounding boxes on the image, each bounding box encompassing a corresponding relevant region. In implementations where the image classification model comprises a semantic segmentation model, the output may identify every pixel in the target image that corresponds to a surface feature consistent with subsurface hydrogen accumulation.

Where the apparatus 200 analyzes multiple target images, the apparatus 200 may thereafter output an indication of every target image of the multiple target images that contains surface features consistent with subsurface hydrogen accumulation. To this end, the apparatus 200 may include means, such as relevance determination engine 214, for clustering various identified surface features together based on their similarities. To do this, the model generator 210 may train a supervised or unsupervised machine learning model using K-means/K-medians clustering, means-shift clustering, or density-based spatial clustering of applications with noise (DBSCAN), a Gaussian mixture, or the like to perform clustering on surface features identified in the manner set forth above. Following identification of a set of surface features, the apparatus 200 may include means, such as image analysis engine 212, for clustering the set of surface features using a trained clustering model. Subsequently, the relevance determination engine 214 may utilize the clustered surface features to adjust weights applied to the likelihood that various surface features are indicative of active subsurface hydrogen accumulation (the estimation of which is described below in connection with operation 604 of FIG. 6).

In some embodiments, the procedure may end following completion of operation 506. However, in other embodiments, the procedure may thereafter advance to the set of operations illustrated in FIG. 6 and described below, in which case an identified surface feature is analyzed to estimate its likelihood of indicating active subsurface hydrogen accumulation.

Turning next to FIG. 6, example operations are shown for automatically identifying whether a surface feature is indicative of active subsurface hydrogen accumulation. As noted directly above, the series of operations illustrated in FIG. 6 may be performed as the initial set of operations in a given procedure, or they may be performed following analysis of one or more target image by the apparatus 200 as set forth in FIG. 5, in which case operation 602 may be reached following completion of operation 506.

As shown by operation 602, the apparatus 200 includes means, such as processor 202, memory 204, communications circuitry 206, input-output circuitry 208, model generator 210, image analysis engine 212, relevance determination engine 214, or the like, for receiving information describing an ovoid surface feature of the Earth. This information may be received from a variety of sources. For instance, the information may be received from image analysis engine 212 upon identification by the image analysis engine 212 of a target image that contains a surface features consistent with subsurface hydrogen migration to the surface. As noted previously, such surface features may often comprise ovoid surface features. This information may alternatively be received from a local memory 204 of the apparatus 200, which may have previously stored the information during performance of the procedure set forth in connection with FIG. 5, or which may have previously received the information from a separate device. The information may alternatively be received by communications circuitry 206, which may gather the information from a separate device that performs the procedure set forth in FIG. 5, or from a user device (e.g., one of user devices 118A-118N), or from a separate data store containing the information describing the ovoid surface feature. Still further, the information may be received from input-output circuitry 208 in scenarios where the information is provided directly by a user, such as via a peripheral device.

As described above, ovoid surface features, and in particular surface depressions, are in some cases caused by hydrogen seepage from the subsurface and therefore comprise geomorphological features consistent with the accumulation of hydrogen in the subsurface. However, many ovoid surface features are created by geological events that are unrelated to hydrogen accumulation (such as sinkholes, kettle lakes, meteorite impacts, or the like) despite being geomorphological features consistent with the accumulation of hydrogen in the subsurface. In addition, many ovoid surface features are not connected to active accumulation of hydrogen, and were created by hydrogen seepage from since-depleted systems. Accordingly, further evaluation of a given ovoid feature enables determination of whether it is a likely indicator of active subsurface hydrogen accumulation.

While on-site evaluation may provide a solution for determining whether an ovoid surface feature is caused by active hydrogen seepage from the subsurface, there are many thousands of ovoid surface features around the world, and it would be impractical to perform on-site evaluation of all such surface features. Accordingly, a need exists to further examine known ovoid surface features with tools that can estimate the likelihood that a given ovoid surface feature is an indicator of active subsurface hydrogen accumulation. In so doing, ovoid surface features can be identified and ranked for their likely relevance to active subsurface hydrogen accumulation, thereby permitting the allocation of on-site exploratory solutions.

As shown by operation 604, the apparatus 200 includes means, such as relevance determination engine 214 or the like, for automatically estimating a likelihood that a given ovoid surface feature is indicative of active subsurface hydrogen accumulation. Various methods of automated likelihood estimation are contemplated herein, which may generally be classified into four categories. The first category includes detection of indicators of geomorphic differentiation between the ovoid surface feature and its surrounding terrain. The second category includes detection of indicators of a rate of change in one or more contours of the ovoid surface feature. The third category includes detection of indicators about the stratigraphic unit containing the ovoid surface feature. And the fourth category includes detection of indicators that may be apparent from the particular contouring of the ovoid feature. Accordingly, the relevance determination engine 214 may estimate the likelihood that the ovoid surface feature is indicative of active subsurface hydrogen accumulation based on (i) the degree of geomorphic differentiation between the ovoid surface and the one or more surrounding surface features, (ii) the rate of change in one or more contours of the ovoid surface feature, (iii) the indicators about the stratigraphic unit containing the ovoid surface feature, or (iv) the particular contouring of the ovoid feature.

Geomorphic differentiation presents in various ways. As just one example, hydrogen toxicity kills many types of plant life, so vegetation signatures—or lack thereof—at a geographical location of an ovoid surface feature may indicate surficial hydrogen seepage, which is indicative of active subsurface hydrogen accumulation somewhere in the nearby subsurface. As another example, in the case of bare ground, surface feature alterations that are out of balance with the surrounding geomorphology may indicate an elevated deformation rate, which, when present in connection with an ovoid surface feature, also indicates a likelihood of active surficial hydrogen seepage. Example embodiments may utilize DEMs with resolutions that are better than ~10 m in the horizontal and ~5 m in the vertical to identify areas of geomorphic differentiation with multispectral imagery, or from LiDAR or InSAR. Surface features of interest typically form ovoidal, closed surface depressions and therefore have a distinct 3-D shape that can aid in identification.

As another method to evaluate geomorphic differentiation, the relevance determination engine 214 may receive an image of the ovoid surface feature (either from memory 204, from another device via communications circuitry 206, or from a user via input-output circuitry 208). The relevance determination engine 214 may utilize one or more techniques to identify, from the received image, a degree of geomorphic differentiation between the ovoid surface feature and one or more surrounding surface features. For instance, the one or more object detection models trained by the model generator 210 and hosted by the image analysis engine 212 may segment an entirety of a given image to detect not just surface features consistent with hydrogen accumulation but other surface features that are present in the given image. The relevance determination engine 214 may include one or more rules sets or statistical approaches to calculate the degree of geomorphic differentiation between the surface features consistent with hydrogen accumulation and the surrounding surface features.

Evaluating the rate of change in one or more contours of the ovoid surface feature can be performed in a number of ways. For instance, comparative analysis of multiple images may be used. To this end, the relevance determination engine 214 may receive two images of the ovoid surface feature captured at different times. These two images may be retrieved by the communications circuitry 206 from a separate device (e.g., remote sensing device 114, user device 118A-118N) or data store, from a local memory 204, from a user via input-output circuitry 208, or from a combination of these pathways. Many remote sensing systems store historical image data dating back many years, and in some cases this image data is of sufficiently high definition to permit fine-grained comparative analysis to reveal changes in the contours of an ovoid surface at the centimeter scale. For an ovoid surface feature located in corresponding areas, historical image data of this kind permits the automated and immediate evaluation of the images of the ovoid surface feature that were captured at different times to identify surface deformation or alteration of the ovoid surface feature (or the lack thereof). Alternatively, where historical image data is not available, the relevance determination engine 214 may automatically prompt capturing of new image data of the ovoid surface feature for subsequent review and analysis of this kind at a future time. The relevance determination engine 214 may thereafter calculate an elapsed time between the capture of the two retrieved images, and may calculate a degree of difference in the segments of the two images corresponding to the ovoid surface feature. To this end, in some embodiments it may be necessary to perform co-registration of the two images to ensure that the images are spatially aligned and permit a more accurate comparison. Co-registration aligns two images or elevation models in space. Imagery co-registration uses cross-correlation of patterns of pixel brightness between images, while DEM co-registration uses the similarity of surface undulations. Both solve for a shift in image coordinates to align one image to another without changing the underlying image or DEM information itself. After establishing that two images are aligned, the relevance determination engine 214 may thus evaluate changes between the images, such as an ovoid surface feature getting larger or smaller, changes in surface morphology (e.g., surface roughness or moisture content that SAR can detect), or changes in the elevation profile of the ovoid surface feature (which may be received by the hydrogen targeting system 102 as optically-generated DEM, LiDAR, or other data received from one or more remote sensing devices 114). Having calculated both an elapsed time between images and a degree of difference in two images, the relevance determination engine 214 may thus determine the rate of change in the one or more contours of the ovoid surface feature.

Another mechanism for evaluating the rate of change in one or more contours of the ovoid surface feature is to utilize seismic and/or other geophysical (e.g., gravity) data. To this end, the relevance determination engine 214 may first identify a geographical location of the ovoid surface feature. This may be done based on metadata associated with a target image within which an ovoid surface feature is identified, from evaluation of various features of the ovoid surface feature in the image, or the geographical location may simply be received in operation 602 along with other information about ovoid surface feature. Subsequently, the relevance determination engine 214 may receive data indicative of historical seismic (including microseismic) activity at the geographical location of the ovoid surface feature. This data may be retrieving by the communications circuitry 206 from a separate device (e.g., remote sensing device 114, user device 118A-118N) or data store (e.g., data store 106), from a local memory 204 or data store 106, from a user via input-output circuitry 208, or from a combination of these pathways. Existing seismic surveys and active seismographs and geophones exist all over the world that are constantly monitoring seismic activity, and that data that is public in many cases. Depending on the particular location of the ovoid surface feature, there may be historical logs of seismic activity that are sufficiently precise as to enable insight into the subsurface activity at or near the ovoid surface feature. Accordingly, the relevance determination engine 214 may determine the rate of change in the one or more contours of the ovoid surface based on the historical seismic activity at the geographical location of the ovoid surface feature.

Indicators about the stratigraphic unit containing the ovoid surface feature may be sourced from publicly available or proprietary stratigraphic sections, well logs, and/or a data store 106, or from various other resources regarding the geology of the region including the ovoid surface feature. To this end, the relevance determination engine 214 may identify a geographical location of the ovoid surface feature, and may then receive information about the stratigraphic unit containing the identified geographical location. This information may be retrieved by the communications circuitry 206 from a separate device (e.g., remote sensing device 114, user device 118A-118N) or data store (e.g., data store 106), from a local memory 204 or data store 106, from publicly available or proprietary stratigraphic sections, well logs, from a user via input-output circuitry 208, or from a combination of these pathways. The information about the stratigraphic unit may comprise (i) the geological characteristics of the stratigraphic unit, (ii) information regarding hydrogen migration pathways to nearby reservoirs, traps, and seals and the geographical location of the ovoid surface feature or other seeps, (iii) information regarding hydrogen traps or seals proximal to the geographical location of the ovoid surface feature, or (iv) a thermal maturity and/or present temperature of one or more portions of the stratigraphic unit.

Finally, the particular contouring of the ovoid feature may affect the likelihood that the ovoid surface feature is indicative of active subsurface hydrogen accumulation. To this end, as more and more ovoid surface features are identified that are linked to hydrogen seepage, the model generator 210 may more precisely train an image classification model to identify the unique characteristics or contouring associated with such ovoid surface features as opposed to other types of ovoid surface features. Accordingly, the image analysis engine 212 containing the image classification model may be activated by the relevance determination engine 214 to analyze the contours of the ovoid surface feature to determine a likelihood that the ovoid surface feature is caused by surficial hydrogen seepage rather than by another geological event, wherein the likelihood that the ovoid surface feature is indicative of active subsurface hydrogen accumulation comprises the likelihood that the ovoid surface feature is caused by surficial hydrogen seepage rather than another geological event.

As shown by operation 606, the apparatus 200 includes means, such as relevance determination engine 214 or the like, for determining whether the estimated likelihood that the ovoid surface feature is indicative of active subsurface hydrogen accumulation satisfies a predetermined threshold. This predetermined threshold may be predefined and stored by memory 204 of the apparatus 200 for retrieval during operation 606, or it may be user-defined based on a risk appetite of the individual or entity that initiated analysis of a particular ovoid surface feature. Satisfaction of the predetermined threshold may be achieved where the estimated likelihood equals or exceeds a particular probability. It will be appreciated that in some embodiments the relevance determination engine 214 may calculate an estimated likelihood that an ovoid surface feature is not indicative of active subsurface hydrogen accumulation, and that in such embodiments, satisfaction of the predetermined threshold may in fact be achieved where the relevance determination engine 214 estimates that the likelihood is below a particular probability. Based on whether the estimated likelihood satisfies the predetermined threshold or not, the procedure may advance to either operation 608 (where the predetermined threshold is not satisfied) or operation 610 (where it is).

As shown by operation 608, the apparatus 200 includes means, such as memory 204, communications circuitry 206, input-output circuitry 208, or the like, for outputting an indication that the surface feature is not indicative of active subsurface hydrogen accumulation. Memory 204 may store the indication for subsequent use. The communications circuitry 206 may output the indication to a separate device (such as one of user devices 118A through 118N), or may output the indication to a remote data store. The input-output circuitry 208 may deliver the indication directly to a user interacting with the apparatus 200. In some embodiments, operation 608 may be optional, such that the apparatus 200 may take no action if the predetermined threshold is not satisfied. In such embodiments, the apparatus 200 only produces output when the predetermined threshold is satisfied, thus limiting the output of data to scenarios where a high-value surface feature is identified.

As shown by operation 610, the apparatus 200 includes means, such as memory 204, communications circuitry 206, input-output circuitry 208, or the like, for outputting an indication that the surface feature is indicative of active subsurface hydrogen accumulation. As with operation 608, memory 204 may store the indication for subsequent use. The communications circuitry 206 may output the indication to a separate device (such as one of user devices 118A through 118N), or may output the indication to a remote data store. The input-output circuitry 208 may deliver the indication directly to a user interacting with the apparatus 200, such as via a visualization layer overlaid onto a map interface (e.g., Google Maps or GIS software). However, in some embodiments, the apparatus 200 may take no action at operation 610 if the predetermined threshold is satisfied, in which case the apparatus 200 essentially acts as an alerting device indicating only when a high-value surface feature is evaluated. In some embodiments, operation 610 may be optional, such that the apparatus 200 may take no action if the predetermined threshold is satisfied. In such embodiments, the apparatus 200 only produces output when the predetermined threshold is not satisfied, thus limiting the output of data to scenarios where a particular ovoid surface feature is of sufficiently low value that it may be discarded.

It will be appreciated that while the apparatus 200 may provide an indication of whether a surface feature is indicative of active subsurface hydrogen accumulation, optional operation 612 illustrates that the apparatus 200 may further include means, such as memory 204, communications circuitry 206, input-output circuitry 208, or the like, for, after estimating the likelihood that the surface feature is indicative of active subsurface hydrogen accumulation, outputting an indication of the actual estimated likelihood that the ovoid surface feature is indicative of active subsurface hydrogen accumulation. This operation may comprise writing the indication to memory 204, transmitting the indication to a separate device (e.g., a user device 118A through 118N set forth in FIG. 1) or delivering the indication to a user interacting with the apparatus 200 via input-output circuitry 208. The apparatus 200 may output this indication before, after, or in parallel with its performance of operations 606, 608, or 610, or may output this indication as an alternative to the performance of operations 606, 608, or 610. In some embodiments, the apparatus 200 may output this indication in response to performance of operation 604 (as shown in FIG. 6) or in response to performance of either (or both) of operations 608 or 610. For instance, the indication of the estimated likelihood may be withheld if it does not satisfy the predetermined threshold (e.g., operation 612 is not invoked if the procedure advances to operation 608), because in some implementations knowledge of the specific estimated likelihood that a particular ovoid surface feature is indicative of active subsurface accumulation is irrelevant if the likelihood is low. Alternatively, the indication of the estimated likelihood may be withheld if it satisfies the predetermined threshold (e.g., operation 612 is not invoked if the procedure advances to operation 610), in embodiments where knowledge of the specific estimated likelihood for the ovoid surface feature is irrelevant if the ovoid surface feature is already determined to warrant further interest.

As described above, example embodiments provide methods and apparatuses that enable improved identification of subsurface hydrogen accumulations. Considering the recent and expected future growth in demand for hydrogen in combination with low carbon-intensity and/or low energy-intensity of current methods for generating human-made hydrogen, there is a large and growing need for tools enabling the production of natural hydrogen in the subsurface. Example embodiments provide such tools that provide an automated, systematic, and comprehensive approach for identifying locations where hydrogen has likely been generated, transported, and most importantly, accumulated (i.e., trapped), in economic volumes in the subsurface.

FIGS. 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for training an image analysis engine to identify surface features of the Earth consistent with subsurface hydrogen accumulation, the method comprising:
   receiving, by communications circuitry, a training dataset comprising a labeled set of images illustrating surface features consistent with subsurface hydrogen accumulation, the surface features consistent with subsurface hydrogen accumulation comprising ovoid surficial depressions, wherein the labeled set of images comprises panchromatic, multispectral, or hyperspectral images or digital elevation models;
   training, by a model generator and using the training dataset, an image classification model of the image analysis engine to identify whether images contain surface features consistent with subsurface hydrogen accumulation, wherein the surface features comprise changes on the order of millimeters to centimeters per year; and
   hosting the trained image classification model by the image analysis engine.

2. The method of claim 1, further comprising:
   receiving, by the communications circuitry, a target image; and
   identifying, by the image analysis engine and using the image classification model, whether the target image contains any surface features consistent with subsurface hydrogen accumulation.

3. The method of claim 1,
   wherein the image classification model comprises an object detection model, and
   wherein training the image classification model further includes training the image classification model to identify regions within images containing surface features consistent with subsurface hydrogen accumulation.

4. The method of claim 3, wherein the training dataset includes a set of bounding boxes for each image in the labeled set of images, each bounding box for a particular image surrounding a corresponding segment of the particular image that contains a surface feature consistent with subsurface hydrogen accumulation.

5. The method of claim 1, wherein the surface features include dynamic surface deformations in the ovoid surficial depressions over time.

6. The method of claim 5, wherein the dynamic surface deformations comprise swelling or contracting of the ovoid surficial depressions.

7. An apparatus for training an image analysis engine to identify surface features of the Earth consistent with subsurface hydrogen accumulation, the apparatus comprising:
   communications circuitry configured to receive a training dataset comprising a labeled set of images illustrating surface features consistent with subsurface hydrogen accumulation, the surface features consistent with subsurface hydrogen accumulation comprising ovoid surficial depressions, wherein the labeled set of images comprises panchromatic, multispectral, or hyperspectral images or digital elevation models; and
   a model generator configured to train, using the training dataset, an image classification model of the image analysis engine to identify whether images contain surface features consistent with subsurface hydrogen accumulation, wherein the surface features comprise changes on the order of millimeters to centimeters per year;
   wherein the image analysis engine is configured to host the trained image classification model.

8. The apparatus of claim 7,
   wherein the communications circuitry is further configured to receive a target image, and
   wherein the image analysis engine is further configured to identify, using the image classification model, whether the target image contains any surface features consistent with subsurface hydrogen accumulation.

9. The apparatus of claim 7,
   wherein the image classification model comprises an object detection model, and
   wherein the model generator is configured to train the image classification model to identify regions within images containing surface features consistent with subsurface hydrogen accumulation.

10. The apparatus of claim 9, wherein the training dataset includes a set of bounding boxes for each image in the labeled set of images, each bounding box for a particular image surrounding a corresponding segment of the particular image that contains a surface feature consistent with subsurface hydrogen accumulation.

11. The apparatus of claim 7, wherein the surface features include dynamic surface deformations in the ovoid surficial depressions over time.

12. The apparatus of claim 11, wherein the dynamic surface deformations comprise swelling or contracting of the ovoid surficial depressions.

13. A computer program product for training an image analysis engine to identify surface features of the Earth consistent with subsurface hydrogen accumulation, the computer program product comprising at least one non-transitory computer-readable storage medium storing software instructions that, when executed, cause an apparatus to:
   receive a training dataset comprising a labeled set of images illustrating surface features consistent with subsurface hydrogen accumulation, the surface features consistent with subsurface hydrogen accumulation comprising ovoid surficial depressions, wherein the labeled set of images comprises panchromatic, multispectral, or hyperspectral images or digital elevation models; and
   train, using the training dataset, an image classification model of the image analysis engine to identify whether images contain surface features consistent with subsurface hydrogen accumulation, wherein the surface features comprise changes on the order of millimeters to centimeters per year;
   wherein the trained image classification model is hosted by the image analysis engine.

14. The computer program product of claim 13, wherein the software instructions, when executed, further cause the apparatus to:
- receive a target image; and
- identify, using the image classification model, whether the target image contains any surface features consistent with subsurface hydrogen accumulation.

15. The computer program product of claim 13,
- wherein the image classification model comprises an object detection model, and
- wherein the software instructions, when executed, further cause the apparatus to train the image classification model to identify regions within images containing surface features consistent with subsurface hydrogen accumulation.

16. The computer program product of claim 15, wherein the training dataset includes a set of bounding boxes for each image in the labeled set of images, each bounding box for a particular image surrounding a corresponding segment of the particular image that contains a surface feature consistent with subsurface hydrogen accumulation.

17. The computer program product of claim 13, wherein the surface features include dynamic surface deformations in the ovoid surficial depressions over time.

18. The computer program product of claim 17, wherein the dynamic surface deformations comprise swelling or contracting of the ovoid surficial depressions.

* * * * *